(12) United States Patent
Zhou

(10) Patent No.: US 7,916,220 B2
(45) Date of Patent: Mar. 29, 2011

(54) FIXING STRUCTURE

(75) Inventor: Si-Wei Zhou, Suzhou (CN)

(73) Assignee: Qisda Corporation, Taoyuan County (TW)

( * ) Notice: Subject to any disclaimer, the term of this patent is extended or adjusted under 35 U.S.C. 154(b) by 1274 days.

(21) Appl. No.: 11/475,160

(22) Filed: Jun. 27, 2006

(65) Prior Publication Data

US 2007/0000919 A1    Jan. 4, 2007

(30) Foreign Application Priority Data

Jun. 30, 2005    (TW) .............................. 94122183 A

(51) Int. Cl.
*H04N 5/645*    (2006.01)

(52) U.S. Cl. ...................................... 348/825

(58) Field of Classification Search .................. 348/825
See application file for complete search history.

(56) References Cited

FOREIGN PATENT DOCUMENTS

| EP | 1083289 A1 | 3/2001 |
|---|---|---|
| KR | 2000-0034942 A | 6/2000 |
| TW | 530182 | 5/2003 |
| TW | 577500 | 2/2004 |

*Primary Examiner* — Y. Lee
*Assistant Examiner* — Richard Torrente

(57) ABSTRACT

A fixing structure disposed in an electronic apparatus includes at least a display panel and a front casing. The fixing structure includes a joining component and an engaging component. The joining component is disposed on the front casing, and the engaging component is for movably engaging with the joining component. When the engaging component engages with the joining component, the engaging component presses the display panel such that the display panel is tightly attached to the front casing.

12 Claims, 8 Drawing Sheets

FIXING STRUCTURE

This application claims the benefit of Taiwan application Serial No. 94122183, filed on Jun. 30, 2005, the subject matter of which is incorporated herein by reference.

BACKGROUND OF THE INVENTION

1. Field of the Invention

The invention relates in general to a fixing structure, and more particularly to a fixing structure disposed between a display panel and a front casing thereon.

2. Description of the Related Art

Along with technology development, nowadays the flat display has become an essential part of people's daily lives and widely applied to a liquid crystal display (LCD) TV, mobile phone, desktop computer, notebook computer, personal digital assistant (PDA) and voice recorder.

Traditionally, an electronic apparatus equipped with a flat display includes a front casing, a display panel, and a rear casing. The front casing is screwed to the rear casing with the display panel clipped between the front casing and rear casing. To some extent, the front casing and the rear casing have process deviation in manufacture process. When the process deviation is too large, there is easily a gap formed between the display panel and the front casing, which can be seen by the user just from the appearance of the electronic apparatus.

In production process, a conventional method of solving the issue is to disassemble the electronic apparatus and replace the front casing or the rear casing. However, the method needs more labor hours and powers, and material cost, which is very inefficient.

Another method of solving the issue is to increase the number of screws for screwing the front casing and the rear casing. However, this method increases screw holes on the electronic apparatus, thereby reducing production beauty in appearance and increasing labors for screwing the screws in production lines. Meanwhile, due to the need of larger space for the screws, the electronic apparatus cannot meet the requirement for technical products to be thin and small.

SUMMARY OF THE INVENTION

It is therefore an object of the invention to provide a fixing structure. The fixing structure tightly joins the display panel and the front casing by using an engaging component and a joining component. Therefore, not only the gap between the display panel and the front casing can be prevented from being generated, but also the labor hours and powers, and material cost can be reduced in manufacture process. Furthermore, the fixing structure is disposed inside the electronic apparatus, and thus the electronic apparatus can maintain a good appearance. Besides, the fixing structure occupies only a small space close to the display panel, thereby meeting the requirement of the technical production to be thin and small.

The invention achieves the above-identified object by providing a fixing structure disposed in an electronic apparatus. The electronic apparatus includes at least a display panel and a front casing. The fixing structure includes a joining component and an engaging component. The joining component is disposed on the front casing, and the engaging component is for movably engaging with the joining component. When the engaging component engages with the joining component, the engaging component tightly presses the display panel such that the display panel is tightly attached to the front casing.

The invention achieves the above-identified object by providing an electronic apparatus including a display panel, a front casing and a fixing structure. The front casing is for covering the display panel. The fixing structure includes a joining component and an engaging component. The joining component is disposed on the front casing and the engaging component is for movably engaging with the joining component. When the engaging component engages with the joining component, the engaging component tightly presses the display panel such that the display panel can be tightly attached to the front casing.

Other objects, features, and advantages of the invention will become apparent from the following detailed description of the preferred but non-limiting embodiments. The following description is made with reference to the accompanying drawings.

DETAILED DESCRIPTION OF THE INVENTION

Embodiment One

Figure 1:
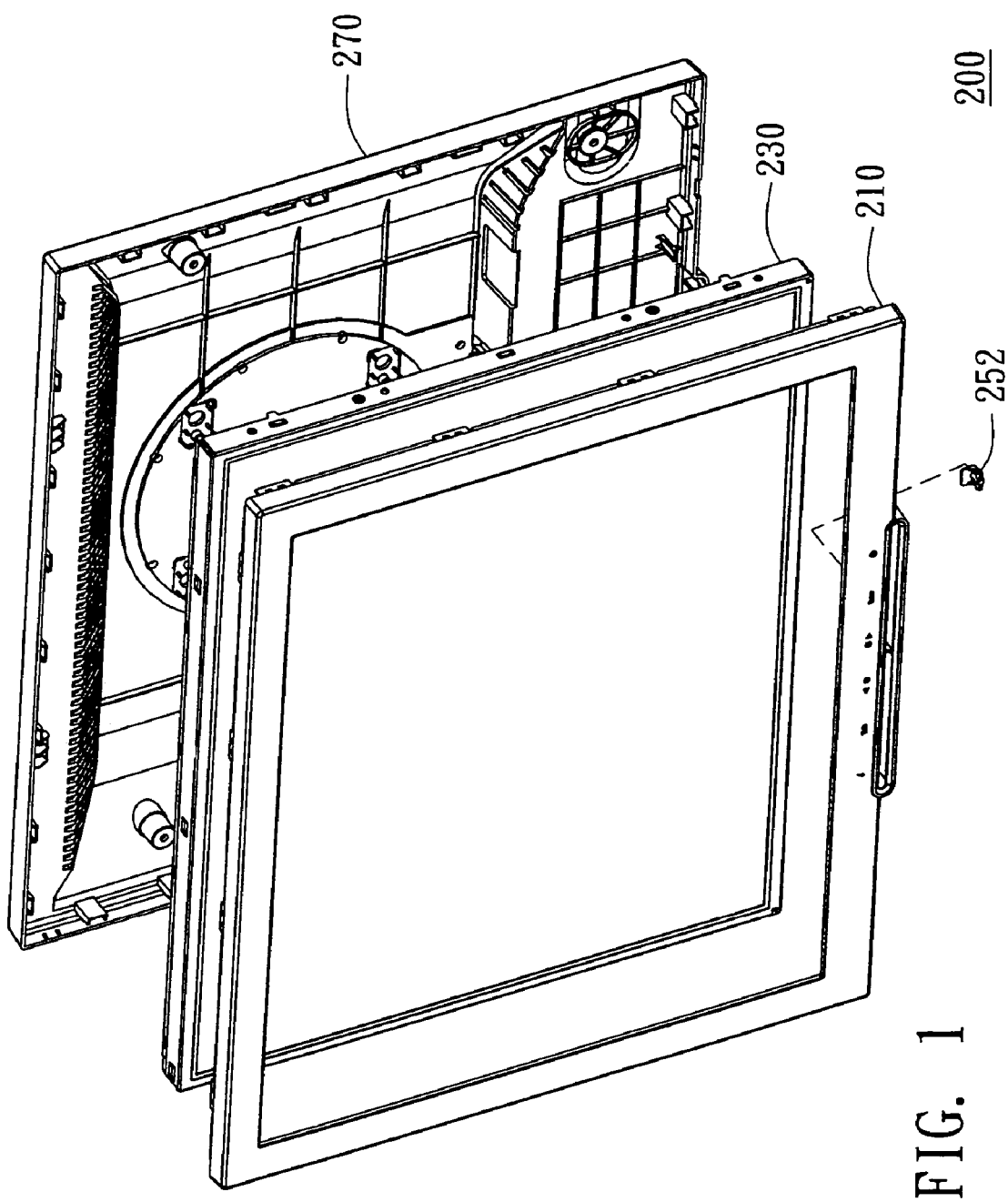
FIG. 1 shows an exploded front-view of the electronic apparatus according to the invention.
Figure 2:
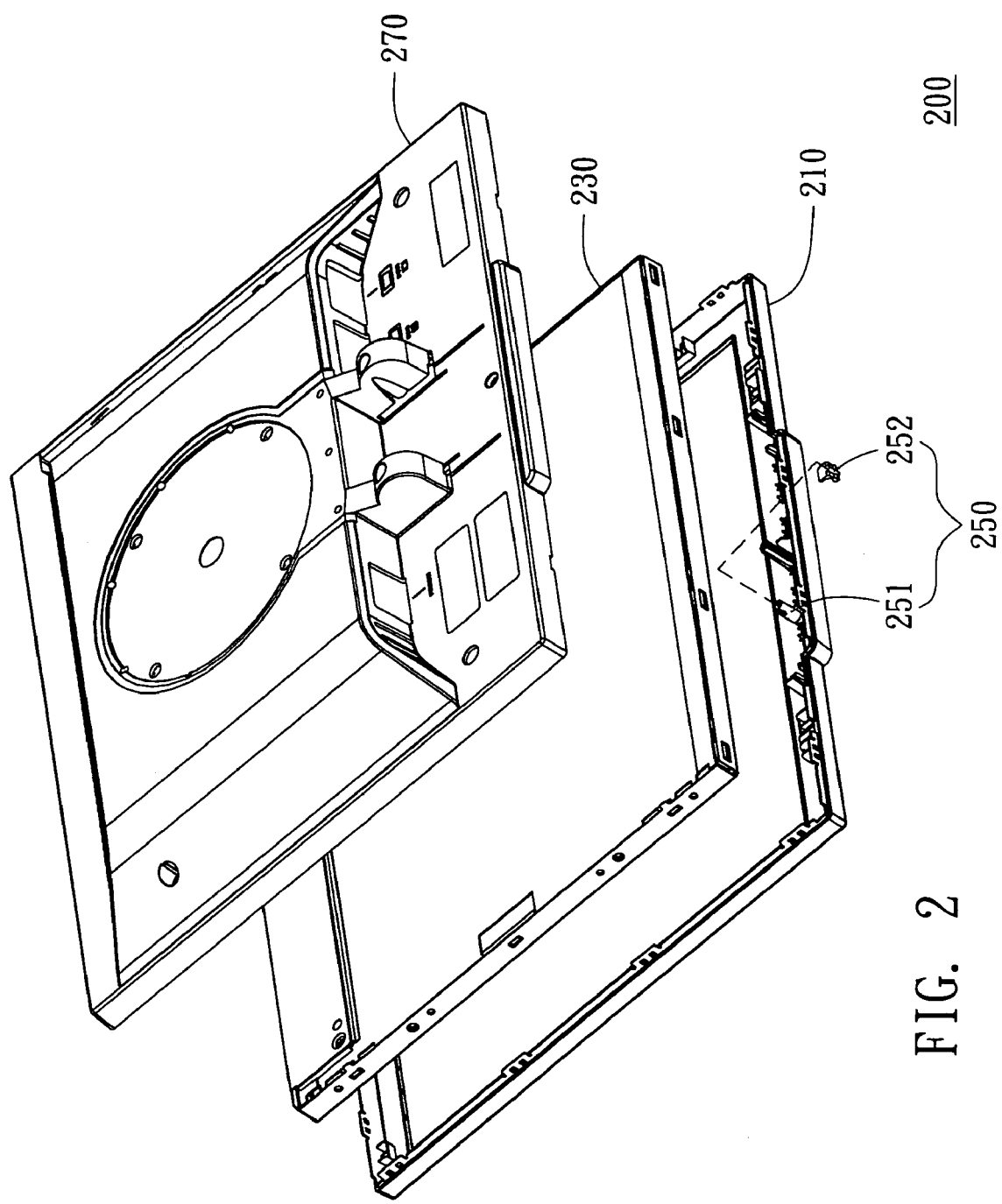
FIG. 2 shows an exploded rear-view of the electronic apparatus according to the invention.

Referring to FIG. 1 and FIG. 2 simultaneously, FIG. 1 shows an exploded front-view of the electronic apparatus 200 according to the invention. FIG. 2 shows an exploded rear-view of the electronic apparatus 200 according to the invention. The electronic apparatus 200 includes a front casing 210, a display panel 230, a rear casing 270 and a fixing structure 250. The front casing 210 is for combining with the rear casing 270, and the display panel 230 is clipped between the front casing 210 and the rear casing 270. Generally speaking, due to the existing process deviation of the front casing and the rear casing in manufacture process, large gaps are easily formed between the lower part, the upper part and two sides of the front casing 210 and the display panel 230, thereby influencing the production beauty in appearance. The fixing structure 250 is disposed at a position between the lower part, the upper part or two sides of the front casing 210 and the display panel 230, where the gaps are easily produced.

Figure 3:
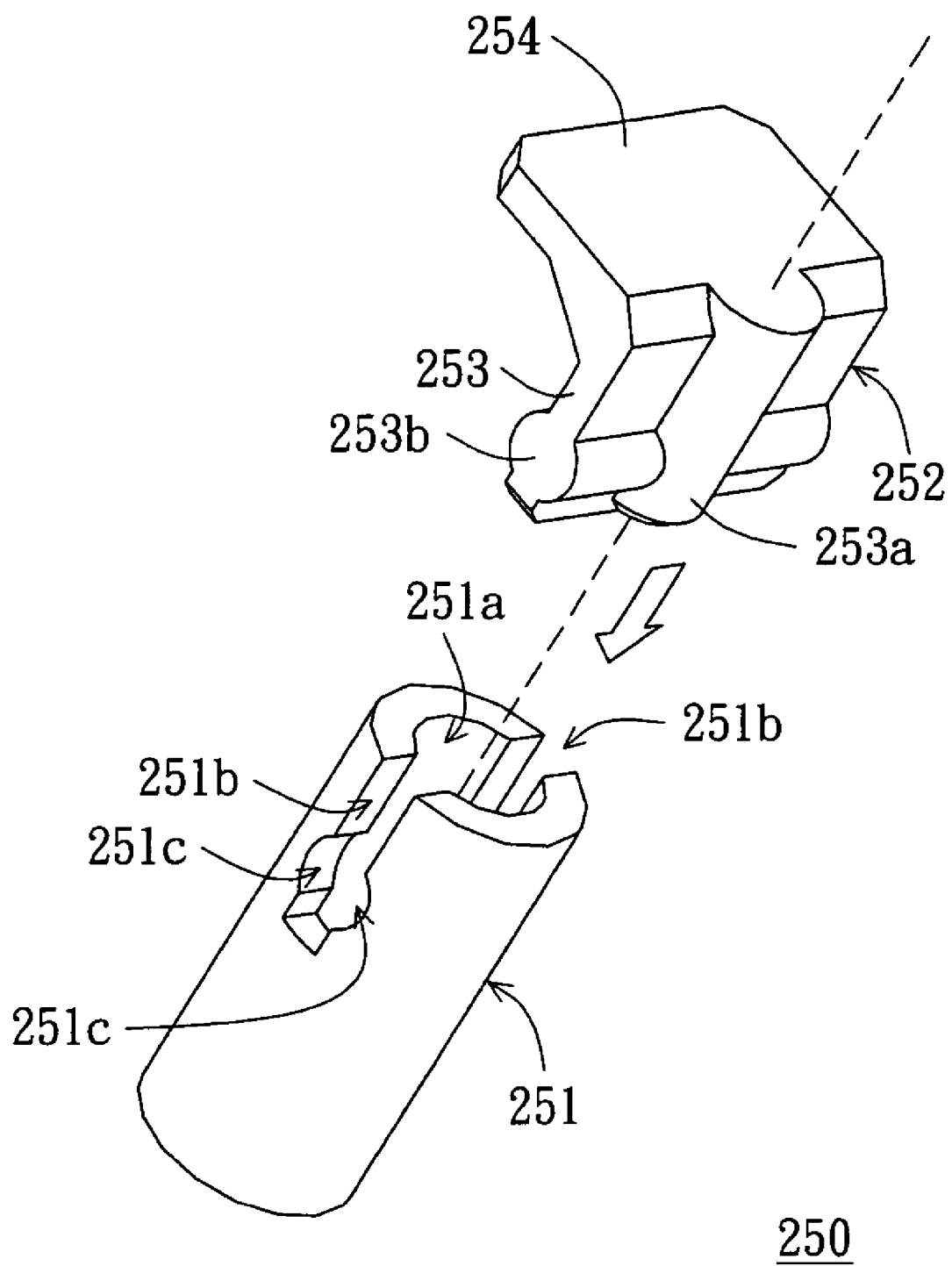
FIG. 3 is a solid view of the fixing structure according to the first embodiment of the invention.

Referring to FIG. 2 and FIG. 3 simultaneously, FIG. 3 is a solid view of the fixing structure according to the first embodiment of the invention. The fixing structure 250 includes a joining component 251 and an engaging component 252. The joining component 251 includes a socket 251*a* and a receiving part. The receiving part has two sliding slots 251*b* and four positioning openings 251*c*. The engaging component 252 has a body part 253 and a projection part 254, and the body part 253 has a first raising shaft 253a and a second raising shaft 253b.

One end of the joining component 251 is made in one tooling with the front casing 210 or attached by glue to the front casing 210. In the embodiment, the joining component 251 is exemplified to be made in one tooling with the front casing 210, and the sliding slots 251b can be formed at the wall of the socket 251a. Besides, the positioning openings 251c can be formed at the edge of the sliding slots 251b.

The body part 253 of the engaging component 252 is connected to the projection part 254 such that the engaging component 252 forms an L-shape cross-section. The first raising shaft 253a and the second raising shaft 253b raise up from the body part 253 and the second projecting shaft 253b crosses to the first projecting shaft 253a. In the embodiment, the positioning openings 251c are semi-circular openings and correspond to the semi-circular cross-sections of the second raising shaft 253b above the body part 253. The engaging component 252 can be made of plastic or tough rubber. In the embodiment, the engaging component 252 is exemplified to be made of hard plastic.

Figure 4:
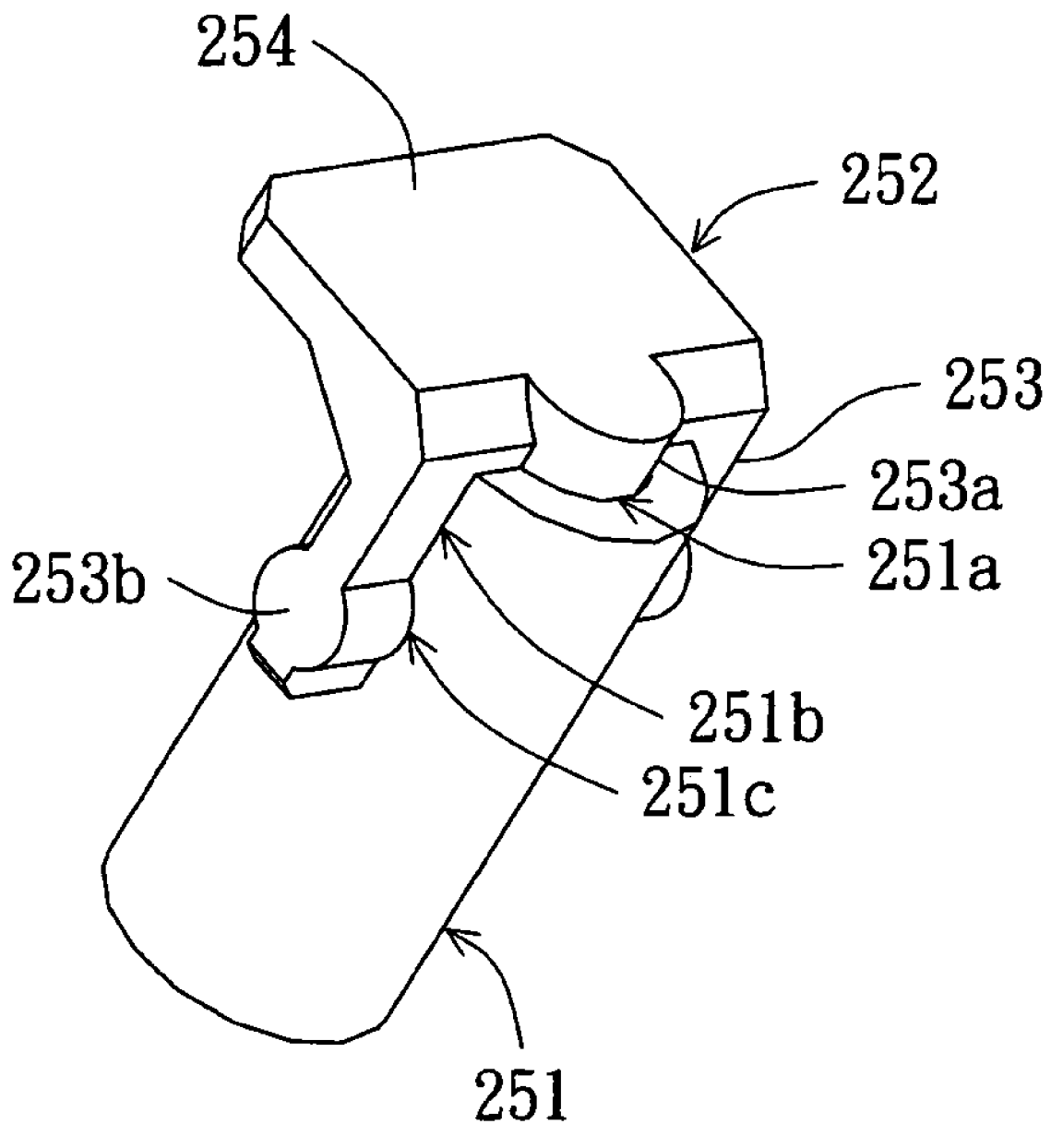
FIG. 4 shows a solid view of the fixing structure with the engaging component combined to the joining component in FIG. 3.
Figure 5:
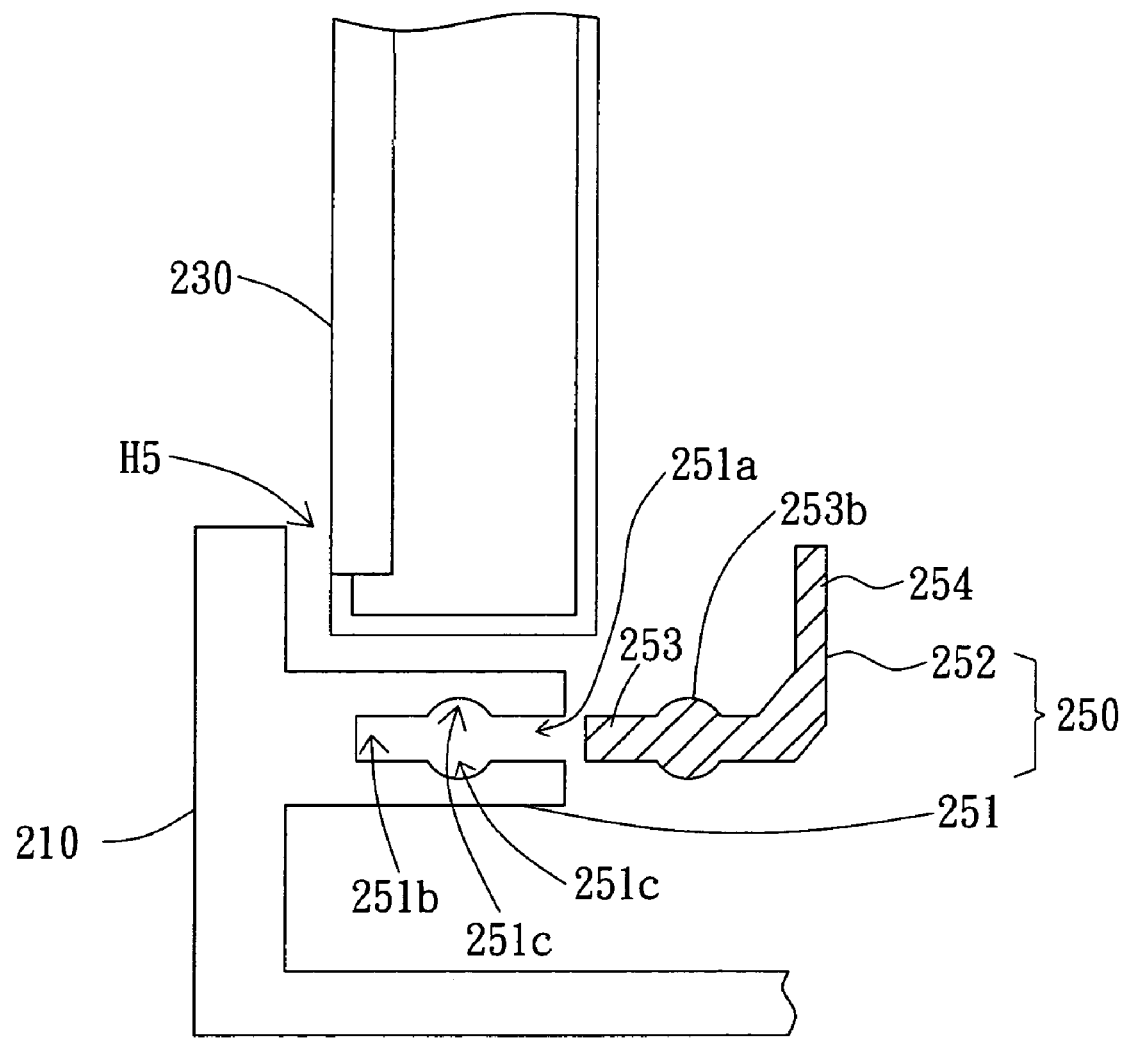
FIG. 5 shows a lateral view of the front casing, the display panel and the fixing structure with the engaging component departed from the joining component in FIG. 2.
Figure 6:
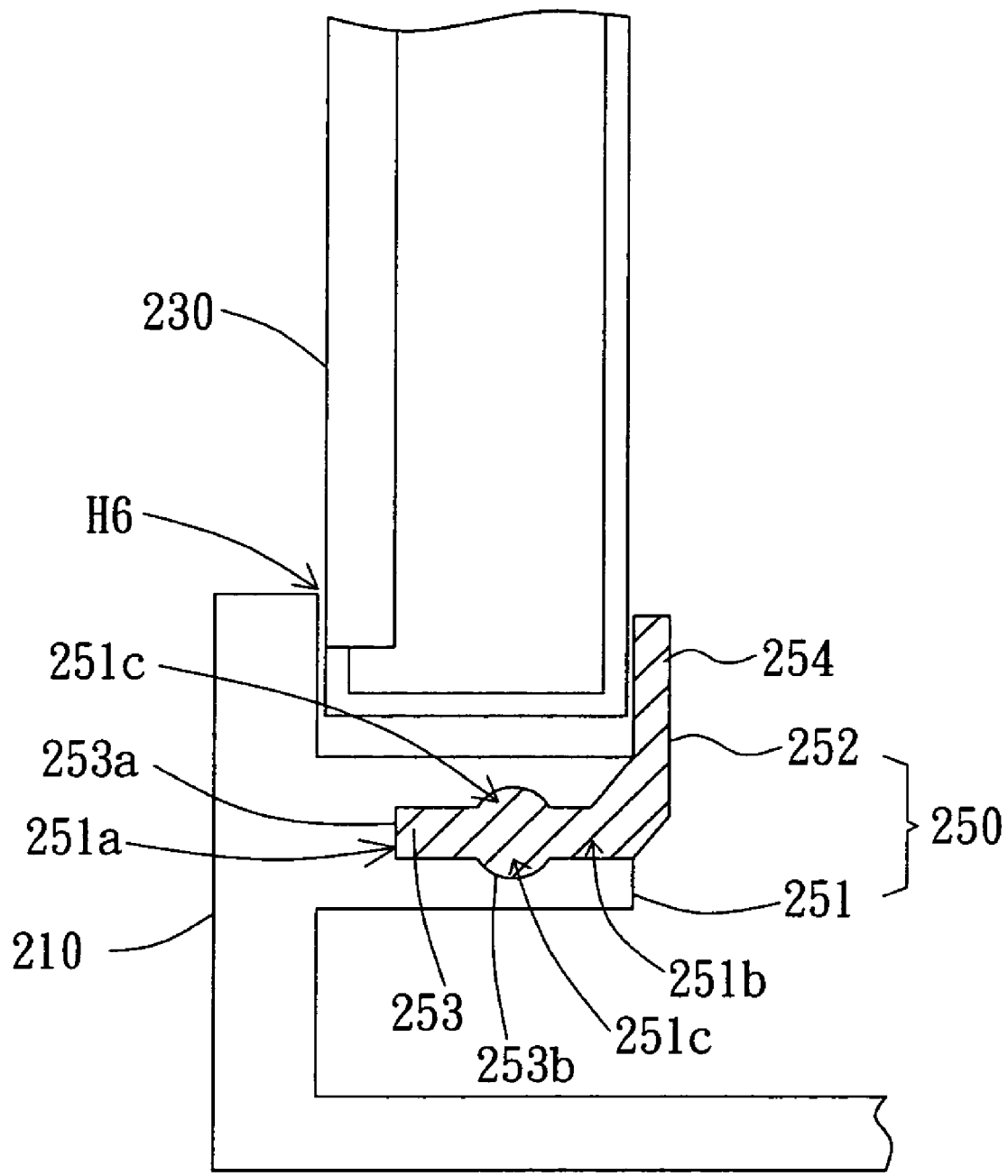
FIG. 6 shows a lateral view of the front casing, the display panel and the fixing structure with the engaging component combined with the joining component in FIG. 5.

FIG. 4 shows a solid view of the fixing structure with the engaging component 252 combined to the joining component 251 in FIG. 3. Referring to FIG. 3 and FIG. 4 simultaneously, the body part 252 slides along the sliding slots 251b to join the joining component 251 with the first raising shaft 253a of the engaging component 252 inserted into the socket 251a. Meanwhile, the projection part 254 presses the display panel 230 along the direction toward the front casing 210. Next, the engaging component 252 continuously slides into the joining component 251 until the second raising shaft 253b engages with the positioning openings 251c. Referring to FIG. 5 and FIG. 6 at the same time, FIG. 5 shows a lateral view of the front casing 210, the display panel 230, and the fixing structure 250 with the engaging component 252 departed from the joining component 251 in FIG. 2. FIG. 6 shows a lateral view of the front casing 210, the display panel 230 and the fixing structure 250 with the engaging component 252 combined with the joining component 251 in FIG. 5. As shown in FIG. 5, before the engaging component 252 combines with the joining component 251, there exists a gap H5 between the front casing 210 and the display panel 230. In the process of combining the engaging component 252 and the joining component 251 of the fixing structure 250, the projection part 254 presses the display panel 230 toward the front casing 210. As shown in FIG. 6, after the engaging component 252 combines with the joining component 251, the projection part 254 tightly presses the display panel 230 onto the front casing 210 to form a smaller gap H6 than the gap H5.

Embodiment Two

Figure 7:
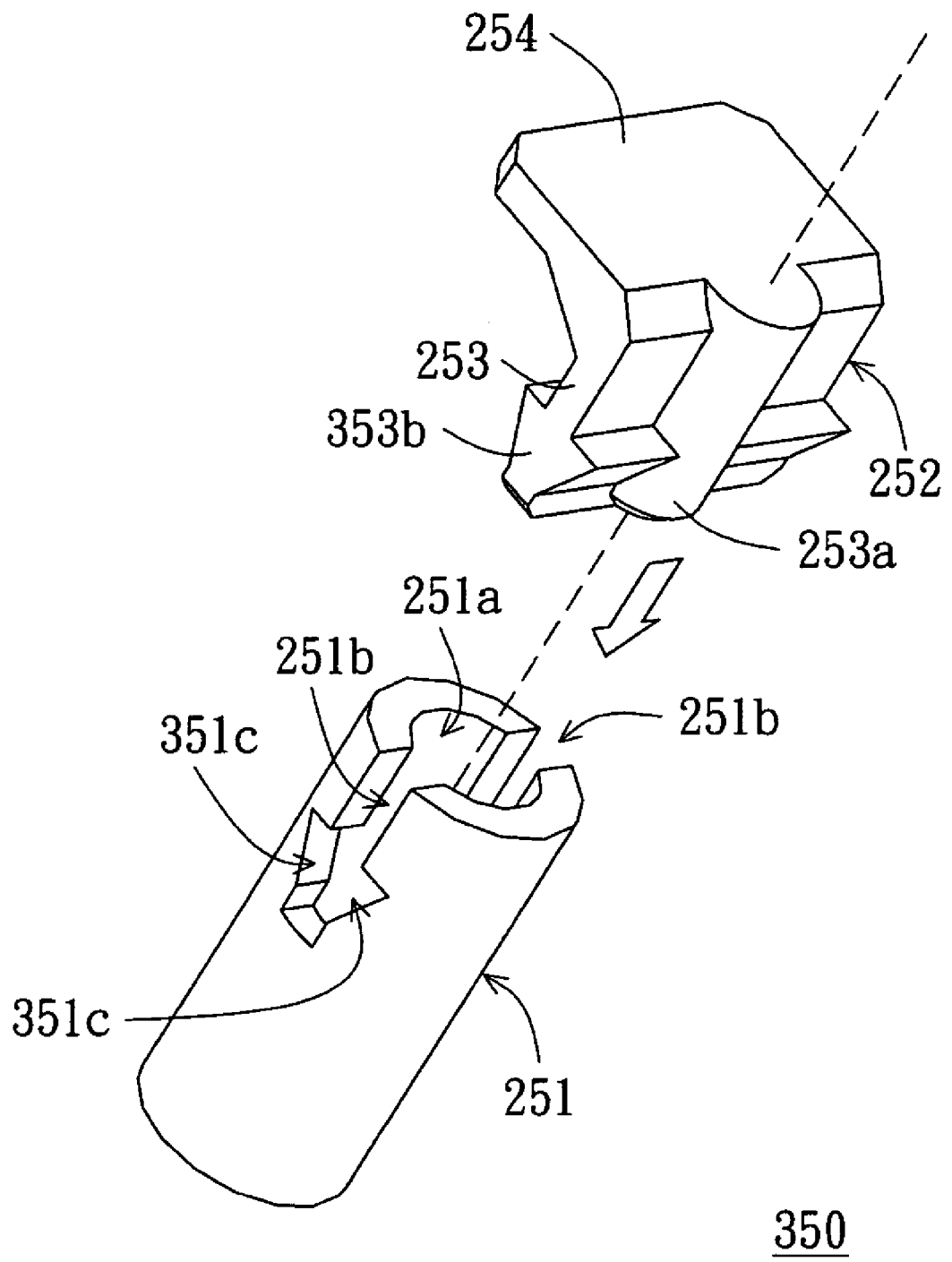
FIG. 7 shows a solid view of the fixing structure according to the second embodiment of the invention.
Figure 8:
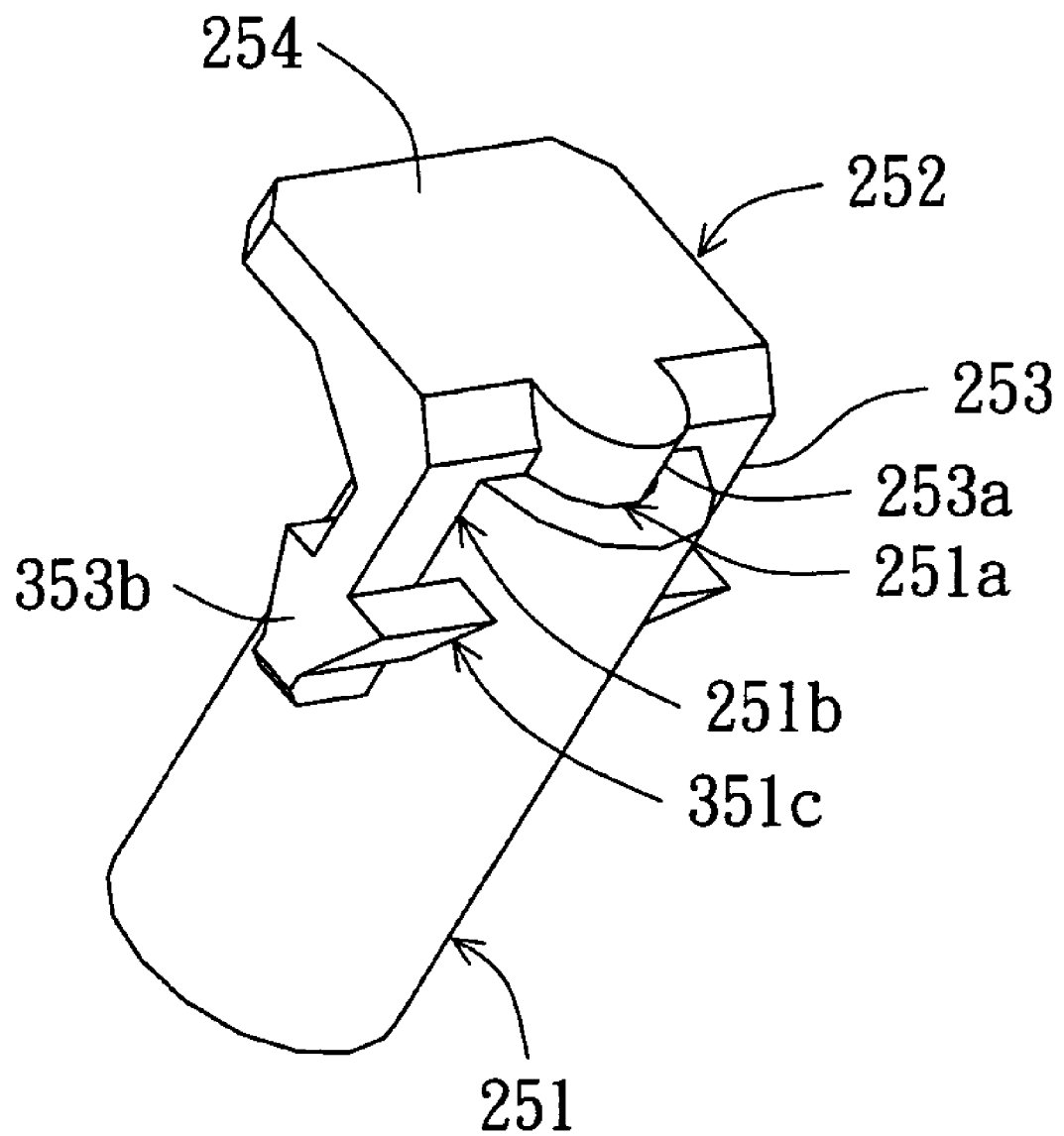
FIG. 8 shows a solid view of the fixing structure with two components combined together in FIG. 7.

Referring to FIG. 7 and FIG. 8, FIG. 7 shows a solid view of the fixing structure according to the second embodiment of the invention. FIG. 8 shows a solid view of the fixing structure with two components combined together in FIG. 7. Compared with the fixing structure 250 of the first embodiment, in the fixing structure 350 of the second embodiment, the joining component 251 has different positioning openings 351c and the engaging component 252 has a different second raising shaft 353b. The rest part of the fixing structure 300 is the same as that of the fixing structure 200 and illustrated by the same symbols as in the fixing structure 200. Thus, any detail of the fixing structure 300 is not necessary described here. In the embodiment, the positioning openings 351c are triangular openings and correspond to the triangular cross-sections of the second raising shaft 353b above the body part 253. As shown in FIG. 7, when the engaging component 252 is to be inserted to the joining component 251, the body part 252 slides into the joining component 251 along the sliding slots 251b with the first raising shaft 253a inserted into the socket 251a. Meanwhile, the projection part 254 presses the display panel 230 along the direction toward the front casing 210. Next, the engaging component 252 goes on to slide into the joining component 251 until the second raising shaft 353b engages with the positioning openings 351c. At the time, the projection part 254 tightly presses the display panel 230 onto the front casing 210.

According to the above-mentioned two embodiments, although the joining component having semi-circular or triangular positioning openings and the second raising shaft of the corresponding engaging component having a semi-circular or triangular cross-section above the body part are taken as an example in the fixing structure of the invention, the joining component can also have a semi-circular positioning opening at one side of the socket and a triangular positioning opening at another side of the socket and the part of the second raising shaft above the body part can also have a corresponding semi-circular cross-section at one end and a corresponding triangular cross-section at the other end, or the joining component can have positioning openings of other shapes and the part of the second raising shaft above the body part can have the corresponding shape of cross-sections.

Moreover, although the fixing structure having a second raising shaft and four positioning openings is taken an example in the invention, the fixing structure of the invention can also have a number of second raising shaft and a number of corresponding positioning openings. One body part corresponding to two sliding slots and four positioning openings are exemplified in the invention, however, the fixing structure of the invention can also include a joining component having a number of body parts and an engaging component having a number of corresponding sockets, sliding slots and positioning openings. As long as the purpose of tightly pressing the display panel onto the front casing can be achieved by combining the joining component and the engaging component, all these will not depart from the scope of the invention.

In addition, although the fixing structure is exemplified to be disposed between the lower part of the front casing and the display panel in the invention, the number and position of the fixing structure disposed between the front casing and the display panel is not limited. As long as the purpose of tightly pressing the display panel onto the front casing can be achieved by combining the joining component and the engaging component, it will not depart from the scope of the invention.

In the fixing structure disclosed by the above-mentioned embodiment, by combining the engaging component with the joining component, the fixing structure can tightly press the display onto the front casing. As a result, not only gaps can be avoided to generate between the display panel and the front casing, but also the labor hours and powers as well as material cost can be reduced in manufacture process. Furthermore, the fixing structure is configured inside an electronic apparatus, thereby maintaining product beauty in appearance, and occupies only a small region in the electronic apparatus near the display panel, thereby meeting the trend of technical products to be thin and small.

While the invention has been described by way of example and in terms of two preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fixing structure, disposed in an electronic apparatus, the electronic apparatus comprising at least a display panel and a front casing, the fixing structure comprising:
   a joining component, disposed on the front casing;
   an engaging component, for movably engaging with the joining component;
   wherein when the engaging component engages with the joining component, the engaging component presses the display panel such that the display panel is tightly attached to the front casing,
   wherein the engaging component comprises:
   at least a body part, for movably inserting into the joining component, the body part comprising:
      a first raising shaft, made in one tooling with the body part and raised from the surface of the body part; and
      at least a second raising shaft, made in one tooling with the body part, raised from the surface of the body part and crossing to the first raising shaft; and
   a projection part, connected to the body part to form a L-shape cross-section of the engaging component,
   wherein the joining component comprises:
   a socket, for disposing the first raising shaft;
   at least a sliding slot, formed at a wall of the socket, for the second raising shaft to slide therein; and
   at least a positioning opening, formed at a wall of the socket and connecting the sliding slot, for positioning the second raising shaft; and
   wherein when the first raising shaft of the engaging component slides into the joining component along the sliding slot and engages with the positioning opening, the projection part presses the display panel such that the display panel is tightly attached to the front casing.

2. The fixing structure according to claim 1, wherein the positioning opening is a semi-circular opening and the part of the second raising shaft above the body part has a semi-circular cross-section.

3. The fixing structure according to claim 1, wherein the positioning opening is a triangular opening and the part of the second raising shaft above the body part has a triangular cross-section.

4. The fixing structure according to claim 1, wherein the joining component is made in one tooling with the front casing.

5. The fixing structure according to claim 1, wherein the joining component is attached by glue to the front casing.

6. The fixing structure according to claim 1, wherein the engaging component is made of plastic or tough rubber.

7. An electronic apparatus, comprising:
   a display panel;
   a front casing, for covering the display panel; and
   a fixing structure, comprising:
      a joining component, disposed on the front casing;
      an engaging component, for movably engaging with the joining component;
   wherein when the engaging component engages with the joining component, the engaging component presses the display panel such that the display panel is tightly attached to the front casing,
   wherein the engaging component comprises:
   at least a body part, for movably inserting into the joining component, the body part comprising:
      a first raising shaft, made in one tooling with the body part and raised from the surface of the body part; and
      at least a second raising shaft, made in one tooling with the body part, raised from the surface of the body part and connected to the first raising shaft; and
   a projection part, connected to the body part to form a L-shape cross-section of the engaging component,
   wherein the joining component comprises:
   a socket, for disposing the first raising shaft;
   at least a sliding slot, formed at a wall of the socket, for the second raising shaft to slide therein; and
   at least a positioning opening, formed at a wall of the socket and connecting the sliding slot, for positioning the second raising shaft; and
   wherein when the first raising shaft of the engaging component slides into the joining component along the sliding slot and engages with the positioning opening, the projection part presses the display panel such that the display panel is tightly attached to the front casing.

8. The electronic apparatus according to claim 7, wherein the positioning opening is a semi-circular opening and the part of the second raising shaft above the body part has a semi-circular cross-section.

9. The electronic apparatus according to claim 7, wherein the positioning opening is a triangular opening and the part of the second raising shaft above the body part has a triangular cross-section.

10. The electronic apparatus according to claim 7, wherein the joining component is made in one tooling with the front casing.

11. The electronic apparatus according to claim 7, wherein the joining component is attached by glue to the front casing.

12. The electronic apparatus according to claim 7, is chosen from the group of a liquid crystal display (LCD) monitor, a LCD TV, a plasma TV, a mobile phone, a digital camera and a personal digital assistant (PDA).

* * * * *